Patented June 24, 1930

1,765,676

UNITED STATES PATENT OFFICE

LOUIS CLEVELAND JONES, OF GREENWICH, CONNECTICUT

PROTECTIVE COATING

No Drawing.   Application filed November 21, 1925.   Serial No. 70,662.

My invention relates more particularly to protective coatings for use as a paint covering on metals to prevent corrosion or applied as a water and damp proof covering material on concrete, cement and similar surfaces. Such improved coating is primarily in the nature of a water, alcohol or similar emulsion, such emulsions of asphalt and other bituminous material having come into increased usage as coating materials. Upon evaporation of the water and alcohol, the asphalt or bitumen coalesces and gives an especially durable coating.

Such emulsions are generally made from a black material as a base, such as asphalt, thereby making it exceptionally difficult or quite impossible to impart desirable colors thereto by the addition of pigments. It has been found that the quantity of white or colored pigment necessary to overcome the dense black color of asphalt is so great as practically to destroy or impair the value of the material as a coating.

I have discovered in seeking a pigment to give color to such emulsified asphaltic and bituminous products that powdered or finely-divided metals, such as powdered metallic aluminum, mixed into such aqueous or alcoholic emulsions of coalescible hydrocarbons has the hitherto undiscovered and peculiar effect of maintaining the metallic lustre of such powdered metal even when thoroughly mixed with a comparatively large amount of emulsified material. In this way novel protective coatings may be prepared which retain all the tenacity, elasticity and waterproofing effects of asphalt, yet at the same time have a brilliant metallic lustre which covers the black surface obtained when asphalt alone is used. A vigorous stirring or mixing of the powdered metals in such emulsions appears to coat the black particles of asphalt with the metallic powder which permits the use of a comparatively small amount of the finely-divided metal employed as such pigment.

I have also found that the final coating mixture does not seem to be homogeneous since when applied to a glass surface the underside appears practically black while the top surface exposed to the air shows only the metallic lustre. Such segregation of the metal in drying is of considerable advantage in permitting the use of only a small amount of the powdered metal which is the most expensive constituent of my improved coating. Such emulsions of hydrocarbons or other bituminous materials in water or alcohol, or mixtures of same, form an exceptionally convenient medium for carrying powdered metals to produce a lustrous protective coating which consists broadly of coalescible hydrocarbons emulsified in volatile liquid and containing sufficient powdered metal to impart lustre, color, body, heat radiation or wearing properties.

The following is an illustrative example of one method for producing such improved protective coating: An asphalt emulsion in water consisting of fifty to sixty per cent of asphalt is used as a hydro-asphalt base. The emulsifying agent may be soap, plastic clay or similar compound capable of holding asphalt suspended as an emulsion in the water solution. When clay is used not to exceed ten per cent is sufficient. If the product is to be used in cold weather or to prevent freezing in storage, alcohol preferably ethyl, may be added to replace a part of the water in the emulsion. To such hydro-asphaltic emulsion to form the protective coating having the lustre of metallic aluminum, I add from three to ten per cent by weight of aluminum powder which is first mixed with water and stirred. The amount of water used is sufficient when added to the emulsion to give the desired consistency to the entire mixture for convenient application with a brush or spray. The aluminum powder mixes better with water if first moistened with alcohol. In some cases it is advantageous to add enough alcohol with the aluminum powder to give a consistency satisfactory for application and at the same time rendering the mixture non-freezable.

Another coating composition, which I have found satisfactory, is formed from fifty percent linseed oil emulsified in water in any customary way to which is added not exceeding five percent of powdered bronze metal.

The coalescible hydrocarbons which I may use include ordinary asphalt, bitumens, rubber latex, linseed oil, gums or resins which have been emulsified in water, alcohol or other liquids which do not dissolve the hydrocarbons and which evaporate after the coating has been applied. The less the color of the emulsified hydrocarbon, the less the quantity of metal powder required to give the proper lustre. Copper, bronze or zinc powders may also be used having regard to their different specific gravities, each imparting to the coating the peculiar advantage due to the particular properties of the metal utilized. For example, copper forms an excellent anti-fouling paint while zinc (due to galvanic action with iron) tends to prevent corrosion. In all cases the beneficial lustrous effect is produced by the metal powder coupled with the protective coating produced by the coalescible hydrocarbon base. In place of ethyl alcohol, either pure or denatured methyl, propyl, or butyl alcohol may be used in substantially the same way that I have hereinbefore described.

I claim as my invention:

1. As a new composition of matter, a protective coating comprising an aqueous emulsion of coalescible hydro-asphalt to form the base mixed with finely-divided particles of a metallic powder suspended in, and coating various particles of, said base, said metallicly coated particles being inherently floatable in said emulsion.

2. As a new composition of matter, a protective coating comprising an aqueous emulsion of coalescible hydro-asphalt to form the base mixed with finely-divided particles of powered aluminum suspended in, and coating various particles of, said base, said metallicly coated particles being inherently floatable in said emulsion.

3. As a new composition of matter, a protective coating comprising an aqueous emulsion of coalescible hydro-asphalt to form the base mixed with finely-divided particles of powdered aluminum (not to exceed ten per cent by weight of said base) suspended in, and coating various particles of said base, said metallicly coated particles being inherently floatable in said emulsion.

LOUIS CLEVELAND JONES.